(12) United States Patent
Mon

(10) Patent No.: US 6,354,493 B1
(45) Date of Patent: Mar. 12, 2002

(54) SYSTEM AND METHOD FOR FINDING A SPECIFIC RFID TAGGED ARTICLE LOCATED IN A PLURALITY OF RFID TAGGED ARTICLES

(75) Inventor: Jorge Mon, Boca Raton, FL (US)

(73) Assignee: Sensormatic Electronics Corporation, Boca Raton, FL (US)

( * ) Notice: Subject to any disclaimer, the term of this patent is extended or adjusted under 35 U.S.C. 154(b) by 0 days.

(21) Appl. No.: 09/470,784

(22) Filed: Dec. 23, 1999

(51) Int. Cl.[7] ................................................. G06K 5/00
(52) U.S. Cl. .......................... 235/380; 235/385; 705/28
(58) Field of Search .................................. 235/380, 383, 235/384, 385; 705/28

(56) References Cited

U.S. PATENT DOCUMENTS

| | | | |
|---|---|---|---|
| 4,688,026 A | 8/1987 | Scribner et al. | 340/572 |
| 5,288,980 A | 2/1994 | Patel et al. | 235/381 |
| 5,689,238 A | 11/1997 | Cannon et al. | 340/568 |
| 5,785,181 A * | 7/1998 | Quartararo, Jr. | 209/3.3 |
| 5,963,134 A * | 10/1999 | Bowers et al. | 340/572.1 |
| 6,002,344 A * | 12/1999 | Bandy et al. | 340/825.54 |
| 6,169,483 B1 * | 1/2001 | Ghaffari et al. | 340/572.3 |
| 6,195,006 B1 * | 2/2001 | Bowers et al. | 340/572.1 |
| 6,204,764 B1 * | 3/2001 | Maloney | 340/568.1 |

FOREIGN PATENT DOCUMENTS

| | | | |
|---|---|---|---|
| EP | 0494114 A2 * | 7/1992 | |
| WO | PCT/US98/14637 | 7/1998 | G08B/13/14 |

* cited by examiner

Primary Examiner—Karl D. Frech
Assistant Examiner—April A. Nowlin
(74) Attorney, Agent, or Firm—Rick F. Comoglio; Paul T. Kashimba

(57) ABSTRACT

A method for operator feedback when utilizing an RFID reader to find a specific RFID tagged article located in a plurality of RFID tagged articles is provided. Specific search criteria associated with a desired article are entered into the RFID reader. To begin searching for the specific RFID tagged article, the RFID reader sends out an interrogation signal to the RFID tags. An RFID tag responds with the desired RFID tag data. A processor compares the number of RFID tags matching the search criteria to the total number of RFID tags received. A feedback signal is generated according to the ratio of RFID tags matching the search criteria to the total number of RFID tags received.

25 Claims, 3 Drawing Sheets

SYSTEM AND METHOD FOR FINDING A SPECIFIC RFID TAGGED ARTICLE LOCATED IN A PLURALITY OF RFID TAGGED ARTICLES

CROSS REFERENCES TO RELATED APPLICATIONS

Not applicable

STATEMENT REGARDING FEDERALLY SPONSORED RESEARCH OR DEVELOPMENT

Not applicable

BACKGROUND OF THE INVENTION

1. Field of the Invention

This invention relates generally to radio frequency identification (RFID) for inventory control and more particularly to audio/visual feedback for locating specific RFID tagged articles from a plurality of articles.

2. Description of the Related Art

Taking inventory of articles is a time consuming task that often must be performed in commercial, industrial, and other environments. The development of bar code and graphic readers has helped in inventory taking and inventory tracking applications. However, bar code and graphic reading have certain limitations that include a line-of-sight requirement for proper reading, and the capability of only one way data transfer of small amounts of data.

It is known in the art to utilize RFID tags attached to articles for inventory tracking and control. An RFID tag is attached to each article that is desired to be inventoried or tracked. The RFID tag stores data associated with the article. An RFID reader scans for tags by transmitting an interrogation signal at a known frequency. The RFID tag responds to the interrogation signal with a response signal that contains either data associated with the article, or an RFID tag ID. The RFID reader detects the response signal and decodes the data or the RFID tag ID. In the case of the RFID tag ID, the reader uses the tag ID to interrogate the specific RFID tag identified by the decoded tag ID to receive the stored data associated with the article to which the tag is attached. The act of the RFID reader capturing the stored data is called an RFID read.

Typically, the RFID reader or scanner, is a handheld unit similar in size and appearance to a bar code reader. However, the two-way RF communication between the RFID reader and the RFID tag does not need to be line-of-sight, as in a bar code system. The data stored in the RFID tag can also be changed if desired.

Inventoried articles within a store are sometimes misplaced, and need to be located. At other times, specific articles of inventory simply must be located. To locate a specific article in a store's inventory using RFID, a tag ID or criteria associated with the article are searched for by the RFID reader until that specific article or articles are located. A main drawback to the use of an RFID reader is the lack of any feedback from the reader to the operator. When the operator moves an RFID reader past a plurality of RFID tagged articles, there is no easy way for the operator to tell which of the articles in the plurality is the desired article. What is needed is feedback to the operator from the RFID tag reader to assist in location of a specific RFID tagged article.

Copending patent application Ser. No. 09/332,634, filed Jun. 14, 1999, the disclosure of which is incorporated herein by reference, discloses a feedback system and method for RFID tagged articles using an RFID reader, but does not disclose a method for locating a specific RFID tagged article from a plurality of articles.

U.S. Pat. No. 5,689,238 to Cannon, Jr. et al., the disclosure of which is incorporated herein by reference, discloses an object location system and method that uses an electronic tag attached to the object containing a unique response code. The response code is entered into an interrogator, which sends a signal that causes the tag or interrogator to emit a sound relative to the proximity of the tag. In one disclosed embodiment the tag is active and emits a sound in response to its broadcast response code. In another disclosed embodiment, the tag is passive and emits a modulated reflected interrogation signal, which is used by the interrogator to determine proximity to the tag. In the active tag embodiment, it may not be apparent from a tag sound or signal, which tagged article in a plurality of tagged articles is the desired article. In the passive tag embodiment, the modulated signal reflected from the tag must be received by the interrogator and used to determine the distance to the tag. The interrogator must compare the reflected signal strength to the transmitted signal strength to determine distance to the tag. Thus, the interrogator must include a fairly sophisticated receiver and other circuitry to locate and determine the relative distance to the tag. What is need is an improved method of location of a specific article from a plurality of articles.

BRIEF SUMMARY OF THE INVENTION

The present invention provides a method and system for providing operator feedback when trying to locate a specific RFID tagged article from a plurality of RFID tagged articles. Specific criteria are loaded into an RFID reader for searching. The criteria can be a specific RFID tag ID, a plurality of RFID tag IDs, or a specific search or locate criteria such as all articles over a certain price, all articles manufactured before a specific date, or all articles placed in inventory before a certain date, or any other parameter that is desired to be used to locate articles. When scanning for RFID tags, the RFID reader sends out an interrogation signal to the RFID tags. Depending on the type of RFID system used, the RFID tags respond to the interrogation signal by either transmitting an RFID tag ID or tag data associated with the attached article. When the response from one or more RFID tags received by the RFID reader includes the search criteria, the number of received RFID tag responses that match the search criteria is compared to the total number of RFID tag responses received. The ratio of specific RFID tag responses that meet the search criteria to the total number of RFID tag responses received is used to provide a feedback signal to the operator to help in localizing the specific RFID tagged articles that are desired to be located.

Accordingly, it is an object of the present invention to provide feedback to the operator of an RFID reader to help locate specific RFID tagged articles from a plurality of RFID tagged articles.

Other objectives, advantages, and applications of the present invention will be made apparent by the following detailed description of the preferred embodiment of the invention.

DETAILED DESCRIPTION OF THE INVENTION

Figure 1:
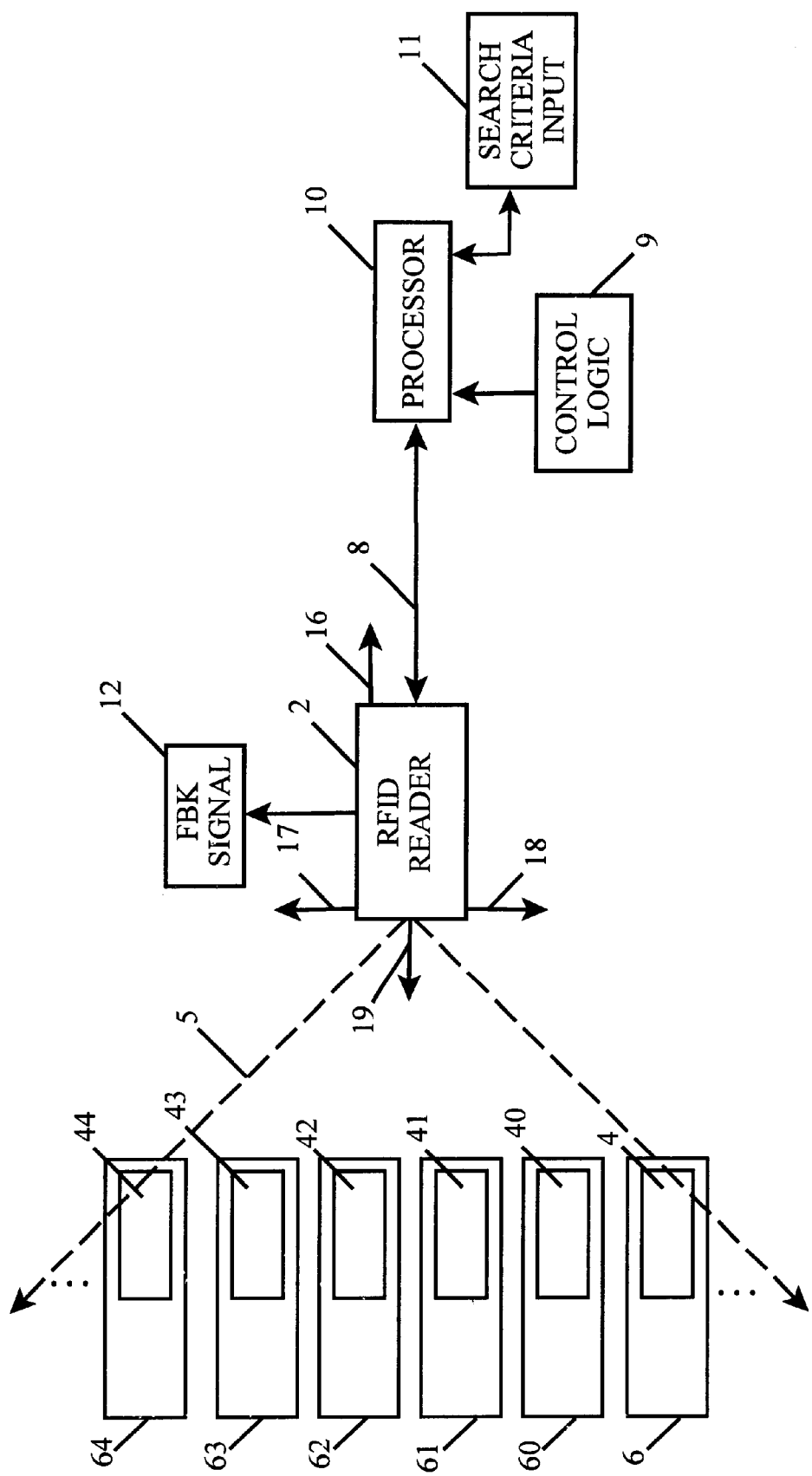
FIG. 1 is a block diagram of one embodiment of the present invention.

Referring to FIG. 1, a preferred embodiment of the present invention uses handheld RFID reader 2 to scan for RFID tags 4, 40, 41, 42, and so on to include any number of RFID tags, which are connected to, attached to, enclosed within, or in some way associated with articles 6, 60, 61, 62 and so on to include any number of articles. Articles 6, 60, 61, 62, and so on, referred herein collectively as articles 6 and individually as an article 6, can be any articles of interest such as articles to be inventoried, tracked, or sorted in a commercial or industrial setting. The RFID reader is preferably a handheld RFID reader 2, but could be a fixed reader by which articles 6 pass. A suitable RFID tag and RFID reader, under the name Intellitag 500, can be purchased from Intermec Technologies Corporation of Everett, Washington, and Intermec's Amtech Systems Division in Albuquerque, New Mexico. RFID reader 2 can be connected via link 8 to processor 10. Link 8 can be hardwired, an infrared modem connection, an RF modem connection, a combination of connections, or any other suitable connections as known in the art. RFID reader 2 can also include a self-contained microprocessor and be capable of storing relatively large amounts of data, and may or may not interface with a remote processor. Processor 10 receives control input from logic control 9 for communication with RFID reader 2. Logic control 9 can be programmable and part of processor 10 or separate. Processor 10 receives control input from input device 11, which can be a keyboard, for entry of specific search criteria. As further described hereinbelow, the search criteria can be a specific RFID tag ID, or specific data associated with an article 6. RFID reader 2 includes a feedback indicator 12, which is preferable an audible indicator, but can be a visual or tactile indicator.

Specific criteria associated with an article 6 are entered via input 11, which can be a keyboard or other suitable interface. The RFID reader 2 scans for RFID tags 4, 40, 41 and so on, referred to herein collectively as RFID tags 4, and individually as an RFID tag 4, by transmitting an interrogation signal to the RFID tags 4. The interrogation signal is transmitted having a preselected interrogation beamwidth or field of coverage 5. RFID tags 4 that are within the field of coverage 5 respond to the interrogation signal by transmitting an RFID tag response signal, which is received by RFID reader 2.

The RFID tag response signal includes, depending on the type of RFID system implemented, an RFID tag ID or stored data associated with the article 6 to which the RFID tag 4 is attached. The RFID reader 2 transmits the interrogation signal and receives from the RFID tags 4 either data associated with the article 6, or an RFID tag ID. The tag ID is used by the RFID reader 2 as an address to interrogate the specific RFID tag 4 having that particular tag ID, which then transmits its stored data associated with the article 6 to which the tag 4 is attached. Therefore, the search criteria can be either a specific RFID tag ID, or specific data associated with the article 6 to which the tag 4 is attached. A separate database of articles and associated REFID tag IDs can be used to select a specific RFID tag ID to locate a specific article. Alternately, data associated with the article 6 can be input directly at 11, such as, but not limited to, a specific videotape or book title, all articles that cost less than or more than a certain amount, all articles that were manufactured prior to a certain date, or placed into inventory prior to a certain date, physical size or weight, or any other parameter that may be desired to be used to locate articles. The RFID reader 2 will then interrogate the RFID tags 4 within the interrogation field of coverage 5 when searching for the specific search criteria entered at 11.

Figure 2:
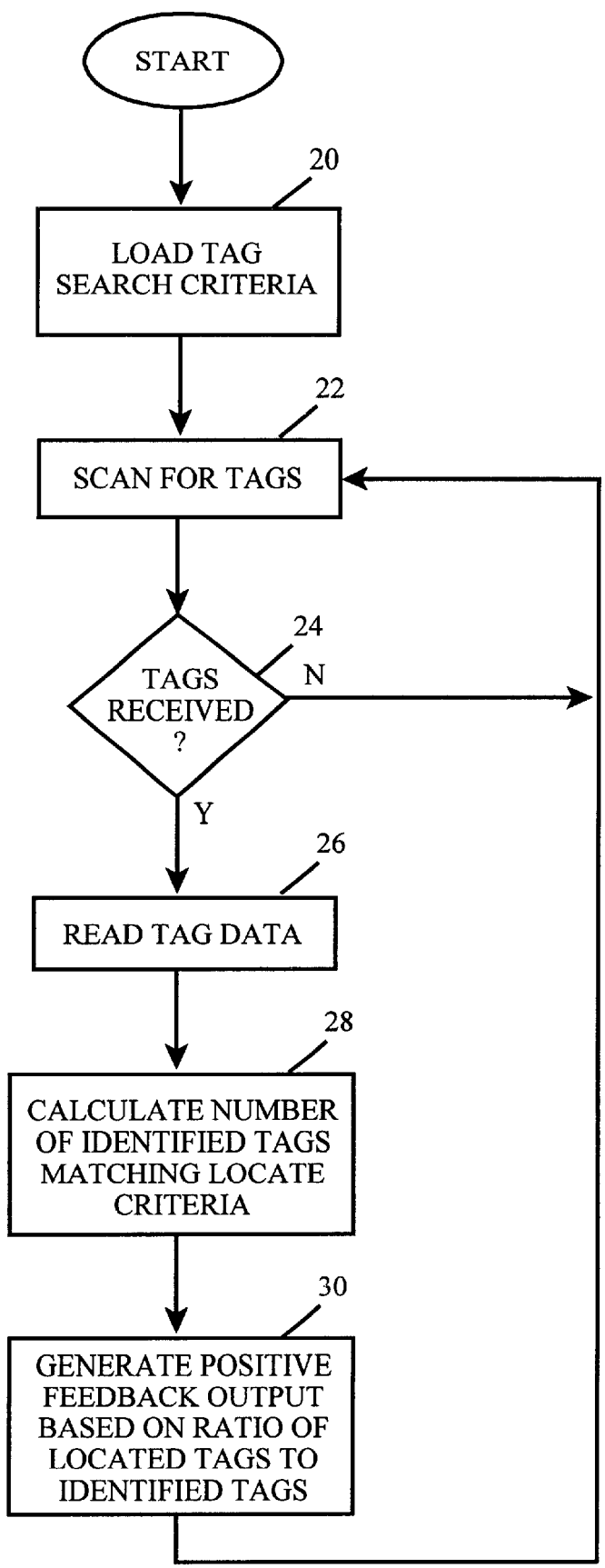
FIG. 2 is a flowchart of one embodiment of the present invention.

Referring to FIG. 2, the process begins by selecting and loading the specific tag search criteria at step 20 into input device 11. As stated hereinabove, the search criteria can be an RFID tag ID or data associated with an article desired to be located. RFID reader 2 then scans for RFID tags at step 22 by transmitting the interrogation signal. If no tags are received at step 24, scanning continues at step 22. If tags 4 are received at step 24, then the data associated with the tag is read at step 26. Step 24 and 26 can occur simultaneously if the search criterion is simply an RFID tag ID. Processor 10 then calculates, out of the total number of tags 4 received, the number of tags 4 received that match the search criteria at step 28. Processor 10 then generates a feedback signal, as frether described below, at step .30 based upon the ratio of RFID tags 4 meeting the search criteria to the total number of RFID tags 4 received by RFID reader 2 at step 24.

Referring again to FIG. 1, when RFID reader 2 receives a response from one or more RFID tags 4 meeting the search criteria, processor 10 counts the total number of responses received from all RFID tags 4 at that time. Processor 10 then generates a feedback signal that is a function of the ratio of RFID tags matching the search criteria to the total number of RFID tags 4 received. In operation, RFID reader 2 interrogates RFID tags 4, 40, 41, 42, 43, and 44 within interrogation field of coverage 5. RFID tags 4, 40, 41, 42, 43, and 44 will each respond with a unique response signal. Assuming that one of the RFID tags matches the search criteria, processor 10 will generate a feedback signal representing a response of 1 tag meeting the search criteria of a total of 6 tags received. A feedback signal will be generated in indicator 12. Preferably, the feedback signal will be a plurality of audible sounds, tone, or beeps in which the frequency of repitition will vary as a function of the ratio of the RFID tags 4 meeting the search criteria compared to the total number of RFID tags received. Alternately, the feedback signal could be visual, tactile, or a combination of signals, the variation of which can include loudness, brightness, vibration level and other indications.

RFID reader 2 can be moved according to arrows 16, 17, 18, and 19 in the vicinity of articles 6 to search for articles matching the search criteria. When the feedback signal is, in the case of an audible signal, heard by an operator indicating that a tag has been received matching the search criteria, the operator will use the feedback signal to pinpoint the desired article.

Figure 3:
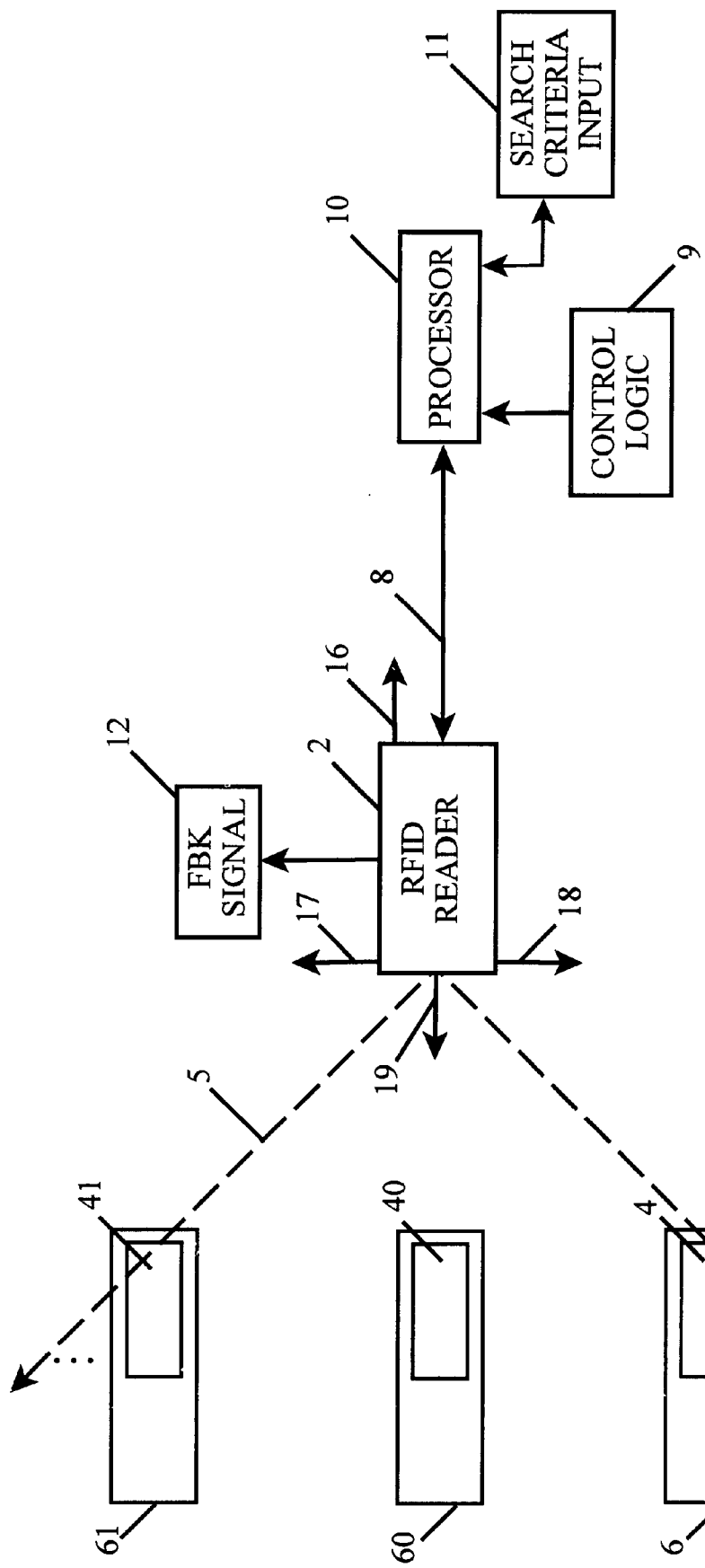
FIG. 3 is a block diagram of one embodiment of the present invention.

Assuming the desired article searched for is article 61, FIG. 3 illustrates moving RFID reader 2 in the direction of arrows 18 and 19 while using the audible feedback signal to localize the RFID tag 41 matching the search criteria. In FIG. 3, as RFID reader 2 is moved, the feedback will change reflecting the change in the ratio of received RFID tags matching the search criteria to total number of RFID tags received by RFID reader 2. The feedback signal will reflect a ratio of 1 to 3 in FIG. 3. That is one tag meeting the search criteria out of a total of three tags received. If RFID reader 2 is moved in the direction of arrow 18, the feedback will stop when RFID tag 41, which is attached to the desired article 61, is no longer within the interrogation field of coverage 5. When that happens, the operator can move RFID reader 2 in the direction of arrows 17 and 16 to reacquire RFID tag 41. By using the audible feedback signals and movement of RFID reader 2 along arrows 17 and 18, the operator can locate the desired article 61. Simultaneously, RFID reader 2 can be moved in the direction of arrow 19 to further restrict the field of coverage 5 to fewer and fewer total number of articles 6 until there is no question as to which article 6 is the desired article 61. The associated feedback with this example could operate in a manner in which the ratio of fewer numbers of total articles 6 to the desired article 61 would produce a higher frequency response. The operator will hear the repetition rate of the feedback signal increase as the reader 2 is moved closer to the desired article 61. Alternately, a louder or brighter response could be used, or any variation that would direct the operator to the desired article 61.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the forgoing disclosure.

What is claimed is:

1. A method of finding a specific article located in a plurality of articles, comprising the steps of:
   providing each article with an RFID tag containing stored information associated with the article;
   selecting RFID tag search criteria associated with the specific article to be found;
   scanning for RFID tags;
   receiving at least one RFID tag data associated with the search criteria;
   counting a total number of RPID tags received along with a number of RFID tags having RFID tag data associated with the search criteria, and,
   generating a feedback signal that is a function of a ratio of the number of RFID tags received having RFID tag data associated with the search criteria to the total number of RFID tags received.

2. The method of claim 1 wherein the step of providing each article with an RFID tag containing stored information associated with the article further comprises providing an RFID tag containing an RFID tag ID.

3. The method of claim 2 wherein the step of selecting RFID tag search criteria associated with the specific article to be found further comprises selecting an RFID tag ID associated with the specific article.

4. The method of claim 3 wherein the step of scanning for RFID tags further comprises scanning for RFID tag IDs.

5. The method of claim 4 wherein the step of receiving at least one RFID tag data associated with the search criteria further comprises receiving said selected RFID tag ID from scanned RFID tags.

6. The method of claim 5 wherein the step of counting the total number of RFID tags received along with the number of RFID tags having RFID tag data associated with the search criteria further comprises counting the total number of RFID tag IDs received along with the number of RFID tag IDs received having said selected RFID tag ID.

7. The method of claim 6 wherein the step of generating a feedback signal that is a function of the ratio of the number of RFID tags received having RFID tag data associated with the search criteria to the total number of RFID tags received further comprises generating a feedback signal that is a function of the ratio of the number of RFID tag IDs received having the selected RFID tag ID to the total number of RFID tag IDs received.

8. The method of claim 1 wherein the step of generating a feedback signal comprises generating a plurality of audible sounds wherein a frequency of repetition varies as a function of the ratio of the number of RFID tags received having RFID tag data associated with the search criteria to the total number of RFID tags received.

9. The method of claim 1 wherein the step of generating a feedback signal comprises generating a plurality of visual signals wherein a frequency of repetition varies as a function of the ratio of the number of RFID tags received having RFID tag data associated with the search criteria to the total number of RFID tags received.

10. The method of claim 1 wherein the step of generating a feedback signal comprises generating a tactile indication wherein a frequency of vibration varies as a function of the ratio of the number of RFID tags received having RFID tag data associated with the search criteria to the total number of RFID tags received.

11. An apparatus for finding a specific article located in a plurality of articles, comprising:
    means for providing each article with an RFID tag containing stored information associated with the article;
    means for selecting RFID tag search criteria;
    means for scanning for RFID tags, said means for scanning including an RFID tag reader;
    means for receiving at least one RFID tag data associated with the search criteria, said means for receiving responsive to said RFID reader;
    means for counting the total number of RFID tags received along with the number of RFID tags having RFID tag data associated with the search criteria, said means for counting responsive to said means for receiving; and,
    means for generating a feedback signal that is a function of the ratio of the number of RFID tags received having RFID tag data associated with the search criteria to the total number of RFID tags received, said means for generating responsive to said means for counting.

12. The apparatus of claim 11 wherein said means for providing each article with an RFID tag containing stored information associated with the article further comprises means for providing an RFID tag containing an RFID tag ID.

13. The apparatus of claim 12 wherein said means for selecting RFID tag search criteria associated with the specific article to be found further comprises means for selecting an RFID tag ID associated with the specific article.

14. The apparatus of claim 13 wherein said means for scanning for RFID tags further comprises means for scanning for RFID tag IDs.

15. The apparatus of claim 14 wherein said means for receiving at least one RFID tag data associated with the search criteria further comprises means for receiving said selected RFID tag ID from scanned RFID tags.

16. The apparatus of claim 15 wherein said means for counting the total number of RFID tags received along with the number of RFID tags received having RFID tag data associated with the search criteria further comprises means for counting the total number of RFID tag IDs received along with the number of RFID tag IDs received having said selected RFID tag ID.

17. The apparatus of claim 16 wherein said means for generating a feedback signal that is a function of the ratio of the number of RFID tags having RFID tag data associated with the search criteria to the total number of RFID tags received further comprises means for generating a feedback signal that is a function of the ratio of the number of RFID tag IDs received having said selected RFID tag ID to the total number of RFID tag IDs received.

18. The apparatus of claim 11 wherein said means for generating a feedback signal comprises means for generating a plurality of audible sounds wherein a frequency of repetition varies as a function of the ratio of the number of RFID tags received having RFID tag data associated with the search criteria to the total number of RFID tags received.

19. The method of claim 11 wherein said means for generating a feedback signal comprises means for generating a plurality of visual signals wherein a frequency of repetition varies as a function of the ratio of the number of RFID tags received having RFID tag data associated with the search criteria to the total number of RFID tags received.

20. The method of claim 11 wherein said means for generating a feedback signal comprises means for generating a tactile indication wherein a frequency of vibration varies as a function of the ratio of the number of RFID tags received having RFID tag data associated with the search criteria to the total number of RFID tags received.

21. An apparatus for finding a specific article located in a plurality of articles, comprising:

a plurality of articles each with an RFID tag containing stored information associated with the article;

an RFID tag reader for scanning for RFID tags;

means for data entry for inputting specific tag search criteria;

a processor connected to said means for data entry and said RFID tag reader for receiving at least one RFID tag data associated with the specific tag search criteria, said processor counting the total number of RFID tags received along with the number of RFID tags received having RFID tag data associated with the specific tag search criteria, and generating a feedback signal that is a function of the ratio of the number of RFID tags received having RFID tag data associated with the specific tag search criteria to the total number of RFID tags received.

22. The apparatus of claim 21 further including a feedback indicator responsive to said feedback signal for generating a variable audible signal.

23. The apparatus of claim 21 further including a feedback indicator responsive to said feedback signal for generating a variable visual signal.

24. The apparatus of claim 21 further including a feedback indicator responsive to said feedback signal for generating a variable tactile signal.

25. The apparatus of claim 21 wherein the specific tag search criteria comprises at least one of an RFID tag ID, a parameter associated with the article price, manufacture date. inventory date, physical size, and description.

* * * * *

UNITED STATES PATENT AND TRADEMARK OFFICE
CERTIFICATE OF CORRECTION

PATENT NO.     : 6,354,493 B1
DATED          : March 12, 2002
INVENTOR(S)    : Mon, Jorge It is certified that error appears in the above-identified patent and that said Letters Patent is hereby corrected as shown below:

Column 3,
Line 64, replace "REFID" with -- RFID --

Column 4,
Line 22, replace "frether described below, at step .30" with -- further described below, at step 30 --
Line 37, insert -- out -- after "criteria"
Line 40, replace "tone" with -- tones --
Lines 41-42, replace "repitition will vary as a function of the ratio of the RFID tags" with -- repetition will vary as a function of the ratio of RFID tags --

Column 5,
Line 35, replace "RPID" with -- RFID --

Column 8,
Line 26, replace "date." with -- date, --

Signed and Sealed this

Fourth Day of June, 2002

Attest:

Attesting Officer

JAMES E. ROGAN
Director of the United States Patent and Trademark Office